Patented Sept. 24, 1940

2,216,017

UNITED STATES PATENT OFFICE 2,216,017

PROCESS FOR VITREOUS ENAMELING

Archer L. Matthes, Youngstown, Ohio, assignor to Bomat Inc., Cleveland, Ohio, a corporation of Ohio No Drawing. Application September 9, 1938, Serial No. 229,128

14 Claims. (Cl. 41—26)

This invention relates to processes of vitreous enameling upon metal bases and is more especially directed to applying various colors thereon, some of which may be overlapping and superimposed.

My invention has for one of its objects the production of a vitreous enameled article having various colors applied thereto with the enameling frit or flux, said frit or flux and coloring pigments being bonded to the prepared base by fusing with a single firing or burning operation.

Those skilled in the enameling art have tried for years to produce multi-colored articles wherein the colors are overlapping or adjacent to each other by vitreous enameling and in a single firing operation, however, the best that has been accomplished before my invention is the production of articles which may have more than one color thereon, provided that such colors do not touch each other, or provided they are not overlapping or superimposed one on the other. As heretofore practiced, the manufacture of multi-colored vitreous enameled articles has been carried out by a separate firing for each color when it is necessary to overlap or superimpose one color upon another. In the manner in which the colors have been applied in the past, if separate firings are not accomplished, then the finished article will be full of blisters and enamel defects and if separate firings are accomplished the finish will not be uniform, but will be stepped up, each subsequent color coating being higher than the last. Also every time a color coat is fired the color fades out so that the first color applied has changed to an undesirable shade after repeated firings and the colors lose the desired brilliance. Furthermore, there is a limit to the number of firings to which the first coat applied can be subjected, so that the prior process has serious limitations.

In the enameling art, as heretofore practiced, coatings averaged about 1⅜ ounces per square foot of surface, (dry weight); some coatings may run as low as 1 ounce or may go as high as 1¾ ounces per square foot. The coating enamels in the present practice should pass through a 40 to 60 mesh screen and in some cases, such as for silk screen work, they are put through a screen as fine as 200 mesh.

One of the objects of my invention is to produce in wet process enameling a finished vitreous enameled article in which the color coating has been applied by a single firing operation, said color coating having various and overlapping colors therein.

A further object of my invention is to produce a multi-colored vitreous enameled article, or one having different hues, shades and different color tone in one firing and having a substantially smooth surface thereon free from blisters and blowholes and other enamel defects.

Another object of my invention is to reproduce vitreous enameled products of various colors, which may be superimposed, one upon the other, by a printing press.

My invention generally comprises a wet enameling process wherein I start with a metal base upon which one ground coat and one or two cover coats of enamel have been applied, this ground coat being a vitreous enamel coating fused to the metal base. I then may apply a fine "wash coating" of frit over the surface to which other colors are to be applied; this wash coating may contain some coloring matter or it may be white. In the wash coating just referred to and in subsequent frits and colors applied to the article thereafter, the particles in the frit and coloring matter may be, and preferably are, of a size to belong to the class of dispersoids; that is, the solution is such that the particles range in size from 0.1 micron to one milli-micron, a micron being equal to .00003937 inch.

In one embodiment of my invention I allow the wash coating to dry either at room temperature for a sufficient length of time, or it may be dried by bringing the article up to 600° Fahrenheit for approximately fifteen to twenty minutes. This temperature and time may be varied, as long as the proper drying of the coating is accomplished. Upon this coating I then apply the design or colors with a coating comprising either frit alone, or a composition of frit and coloring matter mixed up with a vehicle to give the coating the necessary tackiness, so that it can be applied to the base sheet. The composition of this coating is preferably also of a fineness to come within the class of a dispersoid. After a design has been completed and in its various colors applied to the article with a brush by an artist, the article is then finally dried, as it may also be dried between each of the various applications of coating, by bringing it up from room temperature to about 600° Fahrenheit for a period of approximately fifteen to twenty minutes, at which time the solvent should be completely driven out of the coating materials, so that blisters and bubbles will not be formed in the subsequent firing of the article. The word "coating" as used herein does not necessarily mean a complete covering of the article, but may be the covering of a portion only of the whole of a surface.

In ordinary wet enameling practice, as heretofore carried out, there may be 28 to 50 grams per square foot (dry weight) for a single coat or after the ground coat is applied and if it is desirable to apply two coats, then each coat may be 32 grams per square foot each. In my process, I preferably use between 3 to 10 grams (dry weight) per square foot of surface covered, the definite weight depending upon the color, as some colors have more covering power than others.

Particular care must be exercised in preparing the color coat prior to its application to the article. In doing this I start with metallic oxides which are well known to the trade for coloring porcelain enamel and these are mixed with colored or clear frit. The percentage of the mixture depends on the color and fusibility desired and in some cases either colored or clear frit can be used alone. In my coating mixture I use preferably 20 parts of frit to 80 parts of metallic oxides, however, this can be varied, but the ratio of oxide to frit is always kept greater than that used in ordinary wet enameling practice, which uses 95 to 98% frit and from 5 to 2% of metallic oxide.

The metallic oxide, that is, the coloring material and frit or flux, are ground preferably to a suspensoid or dispersoid fineness in an oily or pasty mixture. The type of oil vehicle or paste can be of vegetable, mineral or animal origin, or a mixture thereof, the important point being to obtain a workable plasticity or tackiness. Vegetable vehicles, such as oil of turpentine or lacquer can be used; a mineral vehicle such as highly refined oils, or animal vehicles, such as fats and tallow can also be employed. This coating material is ground to a fineness found only in inks and has not heretofore been used in the production of vitreous enameled articles before my process.

A suitable solvent, such as turpentine or kerosene, Venice turpentine, lavendar oil or clove oil can be added to the mixture, either alone or in combination, when necessary to thin out the coating material, or after it has stood for a period of time and dried, this addition being necessary to adjust the consistency to the artist's touch, or to make a workable material.

This mixture of ceramic material or "ceramic ink" as it may be termed, is then applied to the base with a brush. It can also be applied and very desirable shading effects can be produced, by picking up the ceramic material from a slab or pallette with a dauber of cheesecloth, sponge or other suitable material, depending on the finish and shading effect desired. This coating material can also be applied to the article with an air brush, thus the ceramic material or ink coating is transferred to the surface of the porcelain enamel by tamping or stamping, or brushing, picking up more material from the slab or pallette when necessary. This coating is a very thin coat, as compared to enamel coatings as heretofore known in the art.

A very uniform coating can be applied by this method due to the fact that the coating material may be applied in a very thin or wash coating and the desired results obtained. With this method of application there is also very little waste and the quality is greatly improved.

I have found that a color coating can be brushed onto the base metal using only a small amount of oil in the color coating and using an excess of solvent; this color coating will show the brush marks, which are desirable in a work of art. I then may apply a light spray coating over this brushed coating and the brush marks will still show through and will be present after the work has been fired. I have also found that this fine material will not clog a spray gun and due to its fine character it will not cut out the nozzle.

After the painting and decoration has been completed as far as applying the coating material is concerned, I have invented a method of drying before firing, which differs from the usual method of flashing or firing and which makes it possible to furnish a nearly perfect piece of ware free from defects. This method of drying, combined with the rest of my process makes it possible to apply from one to forty or more colors overlapping and over-painting when necessary. All of these colors can be fused to one another and to the under-coating or ground coat of enamel in one firing operation without bleeding and running together of the colors, and without forming bubbles or blisters in the coating.

This drying operation should be carried out in the manner heretofore described, so as to dry the vehicle and drive out the solvent from the applied coating. This drying operation must be carried out below the flash point of either the vehicle or solvent, so that bubbles and blisters will not be formed by flashing this material and the consequent formation of gases in the applied coating thus prevented. It is apparent that different solvents will be driven off at different temperatures and it is desirable to bring the article up to these temperatures very slowly; that is, the medium or oily vehicle in which the ceramic material was ground, is dried or evaporated in an oven or furnace slow enough at a given temperature or at a rising temperature, so that the medium or vehicle will not form into small particles, gum or congeal. As heretofore stated, this evaporation must take place at a temperature below the flash point of the medium, so as to thoroughly dispose of all the vehicle before firing or fusing the enamel to the ink. During this drying a smoke or vapor is given off by the coating, however, there is not violent sparking or flashing of the material.

In some cases it is desirable or necessary to partly dry the ceramic material or ink before applying an overlapping color; however, this is merely a drying operation and not one of fusing. In the regular wet enamel practice, as heretofore carried out, the method is to apply one coat per color per firing operation. In the prior practice with separate firings for each color the enamel coating becomes very brittle as the enamel gets harder with each firing operation. By the use of my invention I thus improve the quality of the enamel coating because of the single firing and, this also increases the resistance of the coat to chipping.

I have also found that by applying a prime coat or wash coat of ink and frit of the same type of material as the coating to be applied, properly mixed in a vehicle and thinned by a solvent so the coating can be applied very thin and quickly partly dried, leaving a tacky and absorbent surface helps when the subsequent coatings or tacky ceramic inks are to be applied. This creates a type of surface which makes it more practical to apply the ceramic material with a brush or with the spray method.

This type of surface further makes it possible to apply the ceramic material or ink with a printing press, using rubber, metal or other common kinds of type. By thus preparing the surface, the finest kinds of lines and shading can be applied in a printing press when the prime coating is of the desirable tacky and absorbent type. Further, when printing is accomplished it is preferable to partly dry each color before printing and overlapping the next subsequent color. When all the colors have been printed, it is again desirable to dry the coatings for the purpose of evaporation, this drying being carried out below the flash point of the medium, the same as when the coating material has been applied to the article by means of a brush, air brush or other means. The article is then fired in a regular enameling furnace and at the regular enameling temperatures, that is, it is fused to the ground coat by heating to approximately 1510° F. for 3¾ minutes, when the base metal is enameling iron. It is apparent to those skilled in the art that this temperature and time may be varied for different base materials and for various coating materials.

By the practice of my invention it is possible to print signs and pictures in any number of colors and to manufacture them at a production rate. Also, designs of many colors are thus fused into the under-coat in one firing operation. This method presents a big saving and improvement over the present silk screen methods, and is also an improvement over spraying, brushing and burning each color by itself. It has been tried prior in the art to produce multi-colored vitreous enameled articles by spraying thereon suspensions of vitreous enamel. These are necessarily very thick coatings (28 to 65 grams per square foot) and due to their nature cause enamel defects, pinholes, bubbles and blisters in the subsequent firing operations because of the formation of gases under and in the surface of the coating; whereas, in my method the thickness of the applied coating is of the order of .00025 to .00160 inch, per coat, and the following is a table showing various thicknesses of coatings produced by my method and when successive coatings of different colors are laid one upon the other by brushing:

| Color | | Thickness of coatings | |
|---|---|---|---|
| | | Total | Average per coat |
| | | *Inches* | *Inches* |
| 1 | Green | .00025 | .00025 |
| 2 | Brown | .00075 | .000375 |
| 3 | Light blue | .00225 | .00075 |
| 4 | Dark blue | .00275 | .000687 |
| 5 | Red | .0080 | .00160 |
| 6 | Orange | .00925 | .00154 |

The variation in thickness of average coat is caused by the fact that various colored frits have different covering power and also by the fact that upon firing, some coatings sink more into the ground and base coatings than do other colors.

The piece from which the above dimensions were obtained was measured over the ground coat and before the colors were applied; the colors were then applied one over the other with enough of each color showing to enable me to micrometer the thickness properly. Each color was applied to completely cover the subjacent color.

For the coating vehicle I have found that the following mixture makes an excellent vehicle:

| | Parts |
|---|---|
| Venice turpentine | 20 |
| Balsam copaiba | 14 |
| Oil of copaiba | 10 |

With this mixture turpentine can be used with desirable results as a solvent.

Another suitable vehicle is as follows:

| | Parts |
|---|---|
| Venice turpentine | 30 |
| Balsam copaiba | 14 |
| Oil of copaiba | 5 |
| Dominion varnish | 15 |

This latter mixture, however, makes a harder coating and one which fires and dries out at a higher temperature.

It will be apparent to those skilled in the art that by the use of my invention the production of multi-colored vitreous enameled articles will be facilitated and that more nearly perfect products will be obtained, these being free from blowholes, blisters and bleeding and running of the various colors, one into the other. There will also be absent the undesirable optical effect due to the different elevation of colors on the article which is produced at present by the separate firings and the present heavy coatings being applied one upon the other. By the use of my process a much better quality of coating is produced, and one which is less liable to chip as repeated firings of the coatings make them hard and brittle so that they easily chip off.

It will also be apparent that the cost of firing will be reduced to a fraction of that heretofore experienced and that the labor inherent therein will be materially reduced and the firing time also greatly shortened.

To those skilled in the art many modifications of, and widely different embodiments and applications of my invention will suggest themselves without departing from the spirit and scope of the appended claims. The disclosure and description herein are purely illustrative and are not intended to be in any sense limiting.

What I claim is:

1. The method of making vitreous enameled products by the wet enameling process, which comprises the steps of enameling a metal base, applying a design forming coating to said enameled base by thinly brushing thereon a mixture of enamel frit and coloring oxide, the oxide being a major portion of this mixture, drying said coating at a temperature below the flash point of the material in the coating, applying thereon another design forming coating having different color characteristics and in such manner that the coatings overlap in portions thereof, drying said second coating at a temperature below the flash point of the material in the coating, and then subjecting the article to a heat sufficient to vitrefy the enamel to the metal base.

2. The method of vitreous enameling by the wet enameling process on a metal base, which comprises applying thereto a ground coat, grinding ceramic materials and metallic oxides together to a dispersoid fineness of substantially one-tenth micron or less, applying a design forming coating with said materials to the prepared base after mixture with a vehicle, said application being of a washcoating thinness substantially 0.010 inch or less in thickness, drying the coating below the flash point of the vehicle and solvent for a sufficient length of time to evaporate materials in the coating to prevent formation of gases at higher temperatures, applying a different colored design forming coating to the article and drying said coating at a temperature below the flash point of the vehicle and solvent therein and then vitrefying the various applied coatings in one firing operation.

3. The method of applying vitreous enameled coatings to a metal base by the wet enameling process, comprising applying a ground coat to said base, grinding to a dispersoid fineness ceramic materials and metallic oxides, mixing said materials with a suitable vehicle and applying a design forming coating thereof to the prepared base with a brush, drying said applied coating at a temperature below the flash point of the materials therein, applying another similar coating, but of different coloring characteristics, drying said last coating by raising the temperature thereof from room temperature up to a temperature below the flash point of the materials in said coating and subsequently firing the material to vitrefy the enamel thereon.

4. The method of producing a vitreous enameled product by the wet enameling process, which comprises applying to a metal base one or more ground coats, grinding frit or flux to be applied thereon to a suspensoid fineness in an oily mixture, adding thereto a suitable solvent to produce a workable plasticity, applying the coating material to the prepared base in a wash coating and in a design forming manner, drying said coating at a temperature below the flash point of the materials therein and firing said article to vitrefy the enamel thereon.

5. A method of making vitreous enameled articles on a metal base by the wet enameling process, which comprises the steps of preparing the ceramic coating material and coloring oxide by grinding it to a dispersoid fineness of substantially one-tenth micron or less, mixing the coating material and the oxide with a suitable vehicle, applying a design forming coating of said material and oxide to the metal base, drying the said applied coating at a temperature below the flash point of the coating material and for a sufficient time to evaporate materials in the coating to prevent formation of gases at higher temperatures, applying another and different color design forming coat to said base so that at least some of said later applied coat will be superimposed on an earlier applied coat, drying said later applied coat and firing said coatings to vitrefy and bond them to the base metal and to each other.

6. A method of finishing the surface of a metal base by the wet enameling process, comprising the preparation of the coating material by comminuting the major portion thereof to a fineness so as to pass through a 200 mesh screen, said coating material containing frit and coloring oxide, applying said material to designed portions of the base, drying the applied material, subsequently applying to the base another design forming coating material containing a different color than said first applied material, said second coat being applied to some of the same portions on which the first material was applied, drying said second coating and then completing the surface by firing both coatings in one operation.

7. In wet process enameling, the method of printing on a vitreous enameled article which comprises the steps of preparing the metal base by fusing a ground coat thereon, grinding ceramic inks to be used to a fineness so that the major portion thereof will pass through a 200 mesh screen, applying a wash coating of the ceramic ink to said metal base, drying said coating at a temperature below the flash point of the coating materials, applying the ceramic ink to the coated base by suitable printing devices, drying said applied materials at a temperature below the flash point of the printing materials and then fusing the materials to the base by firing all of said material in a firing operation and bonding them to the base.

8. A method of producing multi-colored vitreous enameled products by the wet enameling process, having adjacent or overlapping different colors which comprises the steps of first applying a ground coat and cover coat to a metal base, then applying to the article a wash coating of frit, then applying the color coatings in the design desired and in multiple colors which have been predetermined said color coating being of a dispersoid fineness, drying said article below the flash point of the coating material and firing said article in one firing operation to vitrefy the enamel thereon.

9. A method of printing on a vitreous enameled metal base by the wet enameling process, which comprises the steps of first applying a ground coat to the base, then applying a wash coating of enamel frit of dispersoid fineness to said coated base, and over the surface upon which the printing is to be applied, then printing thereon by the use of enamel frit and coloring oxides as the printing material the oxides comprising a major portion of said printing material, drying the printed article below the flash point of the printing frit and oxides and then vitrefying the enamel thereon by a burning operation in a furnace.

10. A method of the class described including the preparation of a metal base by fusing vitreous enamel thereon, sketching a design on said enameled surface, applying various colors thereon with enameling frit in such a manner that different colors are superimposed, applying said material in coatings less than .010″ thick when measured after firing, drying said applied coatings below the flash point of the materials contained therein and fusing said coloring material and enamel frit to the base and thus bonding it thereto substantially in the manner described.

11. A method of producing multi-colored vitreous enameled products by the wet enameling process, having overlapping different colors thereon, comprising the steps of drawing a design in outline on said metal base, applying colors to a design with a coating of enamel frit and coloring oxide in proportions in which the oxide is substantially greater than the enamel frit, applying said coating to the base lightly in a wash coating and so that different colors are overlapping, drying said coated base at a temperature below the flash point of the coating material and then heating the painted article to a temperature sufficient to bond the colored enamel frit to the prepared base.

12. The method of preparing a design in vitreous enameling which comprises applying a plurality of successive thin design forming coatings to the base material, each of the coatings consisting of a mixture of finely divided frit, coloring oxide and a carrying vehicle, drying said coatings to an extent whereby said vehicle is substantially completely vaporized, and thereafter firing said coatings to a fusing temperature.

13. The method of preparing a design in vitreous enameling which comprises brushing a plurality of successive thin tacky design forming coatings to the base material, each of the coatings consisting of a mixture of finely divided frit, coloring oxide and a carrying vehicle, drying said coatings to an extent whereby said vehicle is substantially completely vaporized, and thereafter firing said coatings to a fusing temperature.

14. The method of preparing a design in vitreous enameling which comprises the steps of applying a ground coating to a metal base, then applying a plurality of successive thin design forming coatings to the base material, each of the coatings consisting of a mixture of finely divided frit, coloring oxide and a carrying vehicle, drying said coatings to an extent whereby said vehicle is substantially completely vaporized, and thereafter firing said coatings to a fusing temperature.

ARCHER L. MATTHES.